Figure 5:
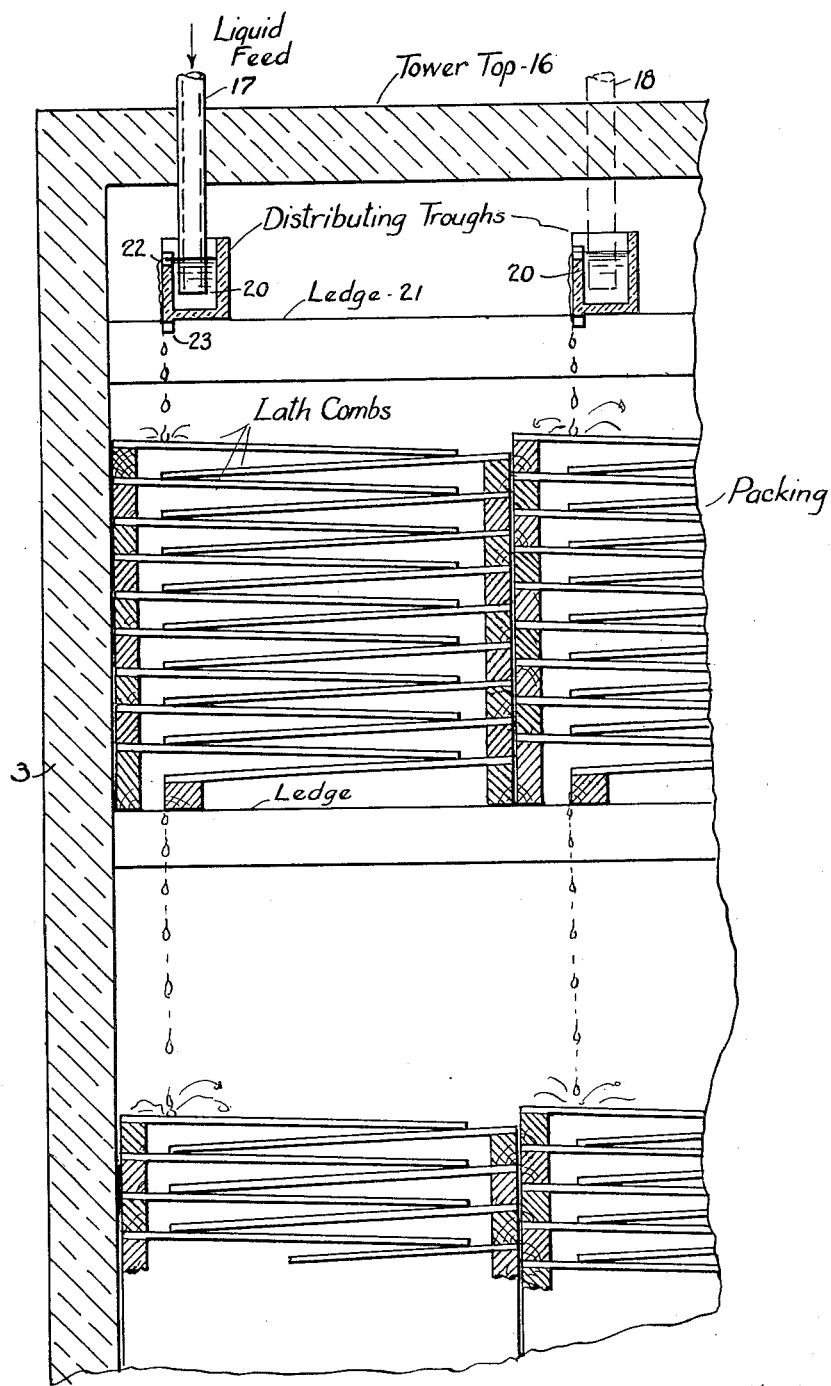

July 4, 1933.  H. H. DOW  1,916,922
REMOVING IODINE FROM DISPERSION IN A LIQUID MEDIUM
Filed Dec. 20, 1929   2 Sheets-Sheet 1
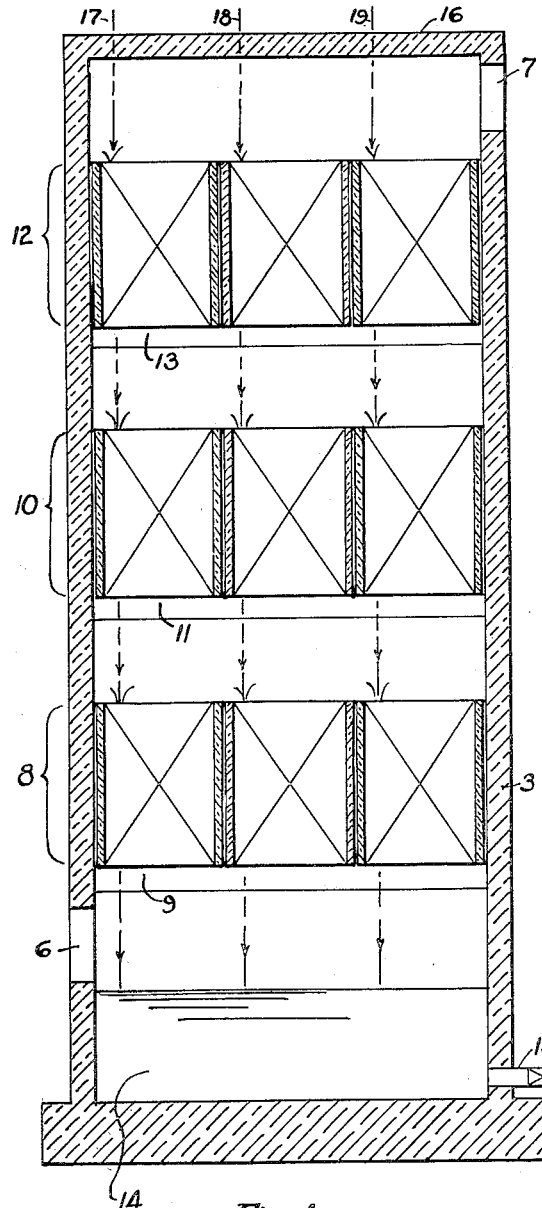
Fig.4
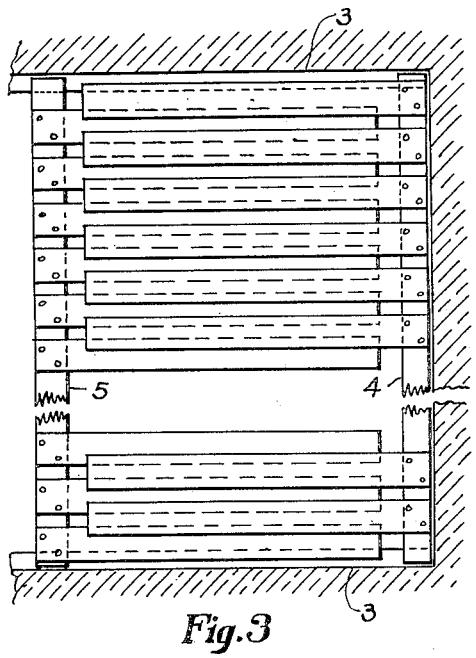
Fig.3
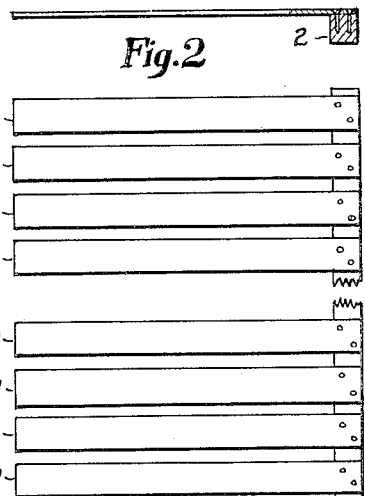
Fig.2
Fig.1
Herbert H. Dow
INVENTOR
BY Thomas Griswold, Jr.
ATTORNEY Patented July 4, 1933

1,916,922

UNITED STATES PATENT OFFICE

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN

REMOVING IODINE FROM DISPERSION IN A LIQUID MEDIUM

Application filed December 20, 1929. Serial No. 415,454.

The present invention relates to the recovery of free or elemental iodine from its solution or dispersion in a liquid medium such as water or a salt solution, into which it has been introduced or in which it may have been formed by liberation from its chemical combination. It relates specifically to methods of so separating the iodine from such dispersion in a liquid medium by the so called method of blowing out, in which method the elemental iodine is transferred from its state of dispersion in a liquid medium into a state of dispersion in a gaseous medium, such as air.

It was not commonly known until recently that iodine in the elemental state could be removed from a dispersed condition in a liquid by blowing out with air, and my invention is concerned with an improved method of blowing out the iodine.

To the accomplishment of the foregoing and related ends, the invention, then, consists of the method hereinafter fully described and particularly pointed out in the claims, the annexed drawings and the following description setting forth in detail one mode of carrying out the invention, such disclosed mode illustrating, however, but one of various ways in which the principle of the invention may be used.

In said annexed drawings:—

Fig. 1 represents in plan view a so called lath comb. Fig. 2 is an end view, such lath comb constituting an improved type of packing for a tower in which the iodine is to be blown out of a liquid medium. Fig. 3 represents in plan view a pile of packing comprised of combs shown in Figs. 1 and 2. Fig. 4 represents in vertical cross section a tower packed with lath combs in a preferred manner suited to the method herein described. Fig. 5 represents to enlarged scale and in greater detail, a vertical cross section of the upper left hand corner of the tower shown in Fig. 4, illustrating the packing and distribution of the liquid medium thereon.

The mechanics attending the transfer of the elemental iodine from its state of dispersion in a liquid medium to dispersion in a gaseous medium involve diffusion and vapor tension as well as a time factor. In order to reduce the time factor it is necessary to spread out the liquid medium into the equivalent of thin films, preferably in motion, in contact with the gaseous medium, and means to accomplish this effectively are herein described.

The method comprises the introduction into a suitable scrubber tower or equivalent, of a stream of the liquid medium in which the iodine is dispersed, the distribution over the packing in said tower of said liquid medium and the passing therethrough of a current of the gaseous medium, such as air.

I prefer to use a packing composed of a plurality of comb-like elements which may be constructed of wooden lath nailed to a wooden backing and to pile such combs one upon another in an inclined position, the teeth of the combs comprising the lath lying generally in the same direction, but the free ends of the teeth of each comb, save the lowermost comb, resting upon the teeth of the comb beneath.

The method of transferring free iodine from a state of dispersion in a liquid to a state of dispersion in a gas consists first in admitting the free iodine containing liquid into the top of a suitable apparatus, specifically a tower, the liquid in the tower passing by gravity flow in a general downward direction, such flow being divided into a plurality of separate and substantially parallel paths in a plurality of superimposed planes inclined to one another in alternate zig-zag relation. The divided flows leaving each such plane are united at least in part and redistributed in divided flows in the plane below. This type of flow can best be attained by means of a series of combs constructed of wooden lath nailed to a wooden backing. These combs are piled up with the teeth inclined downwardly so that the liquid will flow down the face of the teeth to the next comb and thence down its teeth in similar manner, the liquid passing down such a zig-zag path being delivered from the last comb to another series of combs or to a well at the bottom of the tower. Simultaneously with the passage of the free iodine containing liquid in relatively thin layers over the surfaces of the tower filler, a gas is passed through the tower, preferably entering at the bottom thereof, and passing out of the top. This gas, preferably air, thus passes in countercurrent relation with the flow of liquid through the tower and contacts first with the iodine-free or nearly iodine-free liquid at the bottom of the tower. Passing thence upwardly, it contacts with the extended surfaces of the free iodine containing liquid and removes the iodine therefrom. The air passing out of the top of the tower contains the free iodine initially dissolved in the liquid, while the liquid passing out of the tower is substantially free from dissolved iodine. In carrying out this process, the quantity of free iodine containing liquid passing into the top of the tower is regulated so that it is supplied to the top of the combs in distributed manner and in quantity such that in general it will follow the zig-zag paths formed by the combs. At the same time, the quantity of gas passing through the tower may be regulated so that it will remove all or substantially all of the free iodine contained in the liquid passing through the tower. A preferred type of the apparatus and procedure for carrying out the invention will now be described in detail.

Fig. 1 illustrates a form of comb in which a plurality of laths 1, of like length, are nailed at one end to a back 2. Pine laths have been found suitable and hemlock or other wooden back may be employed.

The lath forming the teeth of the comb are nailed to the backing in regular spaced relation thereon, as shown beginning the series near one end of the back and stopping somewhat further short of the other end thereof so that when a plurality of similar combs are piled one upon another, as shown in plan in Fig. 3, the free ends of each lath of one comb will rest in general upon at least two lath of another comb beneath, covering more or less completely the spaces therebetween as well shown in Fig. 3 in which 3 is the tower wall, 4 the superimposed backs of one set of combs, and 5 the superimposed backs of another set thereof. Referring now to Fig. 5, which is a part vertical cross section of a tower in which the lath packing is installed and represents the upper left hand portion of the tower shown in Fig. 4, it will be seen that the lowermost comb in each pile of combs rests upon ledges of the tower in inclined position, and that the next comb above rests in part upon the ledge and in part upon the lower comb teeth being likewise placed in an inclined position having a slope opposite to that of the one below, such slope being preferably at an equal angle with the horizontal as illustrated. By superimposing then, a plurality of combs in alternately left and right hand position, the assembly shown in Fig. 5 may be constructed. Referring now to Fig. 4, the tower 3, having an opening for inlet or exit of gas, 6, an opening for outlet or inlet of gas, 7, is fitted with three layers of packing of the type shown in the previously described figures, the lower-most set resting upon the ledge 9, the intermediate section 10 resting upon the ledge 11, and the upper-most set 12 resting upon the ledge 13. The lower part 14 of the tower forms a cistern to which an outlet pipe 15 may be fitted. Inlets for liquid may be passed through the cover 16 of the tower, e. g. at the indicated lines 17, 18, and 19.

Referring again to Fig. 5 a more detailed disclosure is here well shown, the feed pipes 17 and 18 piercing the top 16 of the tower 3. Distributing troughs 20 may be installed, supported upon a suitable ledge 21 of the tower or otherwise. Such troughs may be of a variety of forms, that shown comprising an open trough having a serrated overflow edge 22 and a serrated drip lip 23 adapted to distribute the liquid in a line on the comb below, adjacent the back thereof. By leaving a suitable space between the distributing trough and the lath comb pile below, a certain amount of additional distribution will be obtained by reason of the splash of the liquid falling upon the upper lath comb and by further leaving a suitable space between successive piles of lath combs, the liquid falling from an upper set to a lower set will splash upon the upper comb of the lower set and further aid in distribution thereon.

The liquid flowing upon the upper comb will be so regulated in amount as to tend in whole or in large proportion to flow along the individual teeth of the comb, which as stated, are inclined and to deliver therefrom onto the teeth of the next lower comb, along which the liquid will then flow in the reversed direction upon the inclined teeth of that comb and will be delivered in like manner to the teeth of the next comb below. The flow of the liquid will follow in this way a zig-zag course in distributed manner over the surfaces of the lath comprising the teeth of the combs and under normal conditions each individual tooth will deliver to two teeth below, thus aiding in maintaining distribution. By reason of such zig-zag course a considerable increase in the time factor of contact in a given height of tower between the liquid and gas is attained, and at the same time the liquid is distributed in a film adapted to effective contact with the gas current. I find that by installing the packing herein described in a series of layers such as illustrated in Fig. 4, inequalities of distribution consequent upon sagging or other defects in one set of comb packing is more or less corrected by the redistribution attained when the liquid drops from that set to the next.

It will be noted that inasmuch as the teeth of the combs are attached to the comb backs in regular spaced relation one to another and in such manner that the teeth of one comb cover the spaces between the teeth of the next lower comb, a circuitous zig-zag path is provided for the gas current causing it to break up, re-unite and again break up time and again in its course through the packing, thereby bringing all portions of the gas current into effective contact with the already effectively filmed and distributed liquid current. I have found that the employment of a packing of the nature herein disclosed permits the ready and effective removal of elemental iodine from a salt brine through which it is dispersed and the transfer thereof to a current of air. It is obvious, however, that the flow of the liquid and the air currents should be regulated to attain and maintain proper distribution, a time factor for the liquid, and relative volume of the air current to liquid. It is also obvious, however, particularly where a single tower is employed, to operate in countercurrent so that the initial iodine-free air will encounter the nearly spent liquid in order that the forces of diffusion and vapor tension may operate under the head necessary to insure the transfer of the iodine from the liquid to the gas phase. It is not, however, necessary to operate in countercurrent, although it is obvious that an air current more richly laden with iodine may be more readily obtained in countercurrent operation.

I have found that ordinary sawn lath, such as are used to support plaster in house finishing, form a fit material, but it is to be understood that planed or finished lumber or other material in like form may be employed. It is unnecessary further that the lath be assembled in the form of combs prior to installing in the tower. They may be laid up individually therein upon shims or other strip-like backing and attain the same results. I have found, however, that economy of handling results from preassembly in the form of a plurality of like combs of substantially the character shown in the drawings.

I have found further that the form of packing herein disclosed enables the blowing out of the iodine in a more satisfactory and economical manner than is obtainable with other forms of packing that I have tried, including coke, lath piled criss-cross, stone ware or other ring packing of various kinds, etc., and that, when the liquid from which the iodine is to be recovered carries solid matter in suspension or solid matter is produced in the blowing step, this type of packing is to a great extent self cleaning and extremely durable under normal conditions of use.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of removing free iodine from solution in a liquid which comprises blowing said liquid with air while flowing in relatively thin layers over extended surfaces in a lath tower.

2. In a method of transferring free iodine from a state of dispersion in a liquid to a state of dispersion in a gas while contacting a current of said liquid with a current of said gas, the steps which consist in dividing a gravity flow of said liquid in a general downward direction into a plurality of separate and substantially parallel paths in a plurality of superimposed planes inclined to one another in alternate zig-zag relation and passing said gas current upwardly through said superimposed planes through the spaces between the said separate paths therein.

3. In a method of transferring free iodine from a state of dispersion in a liquid to a state of dispersion in a gas while contacting a current of said liquid with a current of said gas, the steps which consist in dividing a gravity flow of said liquid in a general downward direction into a plurality of separate and substantially parallel paths in a plurality of superimposed planes inclined to one another in alternate zig-zag relation, uniting, at least in part, the divided flows leaving each said plane and redistributing the so united flows into divided flows in the plane below, and passing said gas current upwardly through said superimposed planes through the spaces between the said separate paths therein.

4. In a method of transferring free iodine from a state of dispersion in a liquid to a state of dispersion in a gas while contacting a current of said liquid with a current of said gas, the steps which consist in dividing a gravity flow of said liquid in a general downward direction into a plurality of separate and substantially parallel paths in a plurality of superimposed planes inclined to one another in alternate zig-zag relation, the separate paths in each such plane being located in general directly above the corresponding spaces between the separate paths in the plane next below, and passing said gas current upwardly through said superimposed planes through the spaces between the said separate paths therein.

5. In a method of transferring free iodine from a state of dispersion in a liquid to a state of dispersion in a gas while contacting a current of said liquid with a current of said gas, the steps which consist in dividing a gravity flow of said liquid in a general downward direction into a plurality of separate and substantially parallel paths in a plurality of superimposed planes inclined to one another in alternate zig-zag relation, the separate paths in each such plane being located in general directly above the corresponding spaces between the separate paths in the plane next below, uniting at least in part, the divided flows leaving each said plane and redistributing the so united flows into divided flows in the plane below, and passing said gas current upwardly through said superimposed planes through the spaces between the said separate paths therein.

6. In a method of transferring free iodine from a state of dispersion in a liquid to a state of dispersion in a gas, the steps which consist in flowing said liquid in a zig-zag course having a general downward direction through a plurality of superimposed inclined courses, each said inclined course containing a plurality of substantially parallel flow-directing strip-like inclined members located in general above the spaces between like members in the course next below, and passing said gas in a general upward direction through spaces between said members in contact with said liquid.

7. In a method of removing free iodine in vapor state from a liquid containing free iodine in dissolved form, the steps which comprise distributing and directing a gravity flow of said free iodine containing liquid over a multiplicity of superimposed planes alternately inclined in zig-zag relation, and passing air upwardly through and between said planes in contact with the free iodine containing liquid flowing thereover, whereby the free iodine is removed therefrom in vapor state.

Signed by me, this 16th day of December, 1929.

HERBERT H. DOW.